US 7,492,277 B2

(12) United States Patent
Zigmond et al.

(10) Patent No.: US 7,492,277 B2
(45) Date of Patent: *Feb. 17, 2009

(54) CONTEXT-SENSITIVE REMOTE CONTROLS

(75) Inventors: Daniel J. Zigmond, Menlo Park, CA (US); Dov Green, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 443 days.

This patent is subject to a terminal disclaimer.

(21) Appl. No.: 11/275,881

(22) Filed: Feb. 1, 2006

(65) Prior Publication Data
US 2006/0125652 A1 Jun. 15, 2006

Related U.S. Application Data

(63) Continuation of application No. 10/641,424, filed on Aug. 15, 2003, now Pat. No. 7,064,675.

(51) Int. Cl.
G08C 19/00 (2006.01)
H04N 5/44 (2006.01)

(52) U.S. Cl. ............ 340/825.72; 340/14.3; 340/825.69; 340/825.49; 348/734

(58) Field of Classification Search ............ 340/825.72, 340/14.3
See application file for complete search history.

(56) References Cited

U.S. PATENT DOCUMENTS 5,909,183 A 6/1999 Borgstahl et al.

| 6,225,938 | B1 | 5/2001 | Hayes et al. | |
|---|---|---|---|---|
| 6,424,660 | B2 | 7/2002 | Jacobson, Jr. | |
| 6,563,430 | B1 | 5/2003 | Kemink et al. | |
| 7,064,675 | B2* | 6/2006 | Zigmond et al. | 340/825.72 |
| 2002/0059387 | A1 | 5/2002 | Wolfe | |
| 2002/0169914 | A1 | 11/2002 | Shteyn | |
| 2003/0075983 | A1 | 4/2003 | Stecyk et al. | |
| 2003/0179100 | A1 | 9/2003 | Zustak et al. | |
| 2006/0181390 | A1* | 8/2006 | Zigmond et al. | 340/5.22 |

FOREIGN PATENT DOCUMENTS

| CN | 1288540 | 3/2001 |
|---|---|---|
| EP | 1411671 A1 | 4/2004 |
| WO | WO00/39964 | 7/2000 |

* cited by examiner

Primary Examiner—Donnie L Crosland
(74) Attorney, Agent, or Firm—Lee & Hayes, PLLC

(57) ABSTRACT

Subject matter includes a reprogrammer for roving remote controllers that are capable of being used in multiple locations with different devices to be controlled at each location. An exemplary roving remote controller changes control code sets to operate whatever devices are present in a particular room. In one implementation, an exemplary multimedia system has reprogrammers for one or more roving remote controllers that adapt to their setting. When a remote controller is moved from a first room to a second room, the program content being controlled in the first room is automatically transferred to the second room.

13 Claims, 9 Drawing Sheets

```
                      ┌──────────────────────────┐       ┌──────────────────────────┐
                      │ Remember a Multimedia    │       │ When the Remote is Moved │
                  500 │ Event Controlled In a    │──────▶│ From the First Room to a │
                      │ First Room By a Remote.  │       │ Second Room, Resume the  │
                      │                          │       │ Multimedia Event in the  │
                      │                          │       │ Second Room.             │
                      └──────────────────────────┘       └──────────────────────────┘
                                 502                                 504
```

Fig. 5

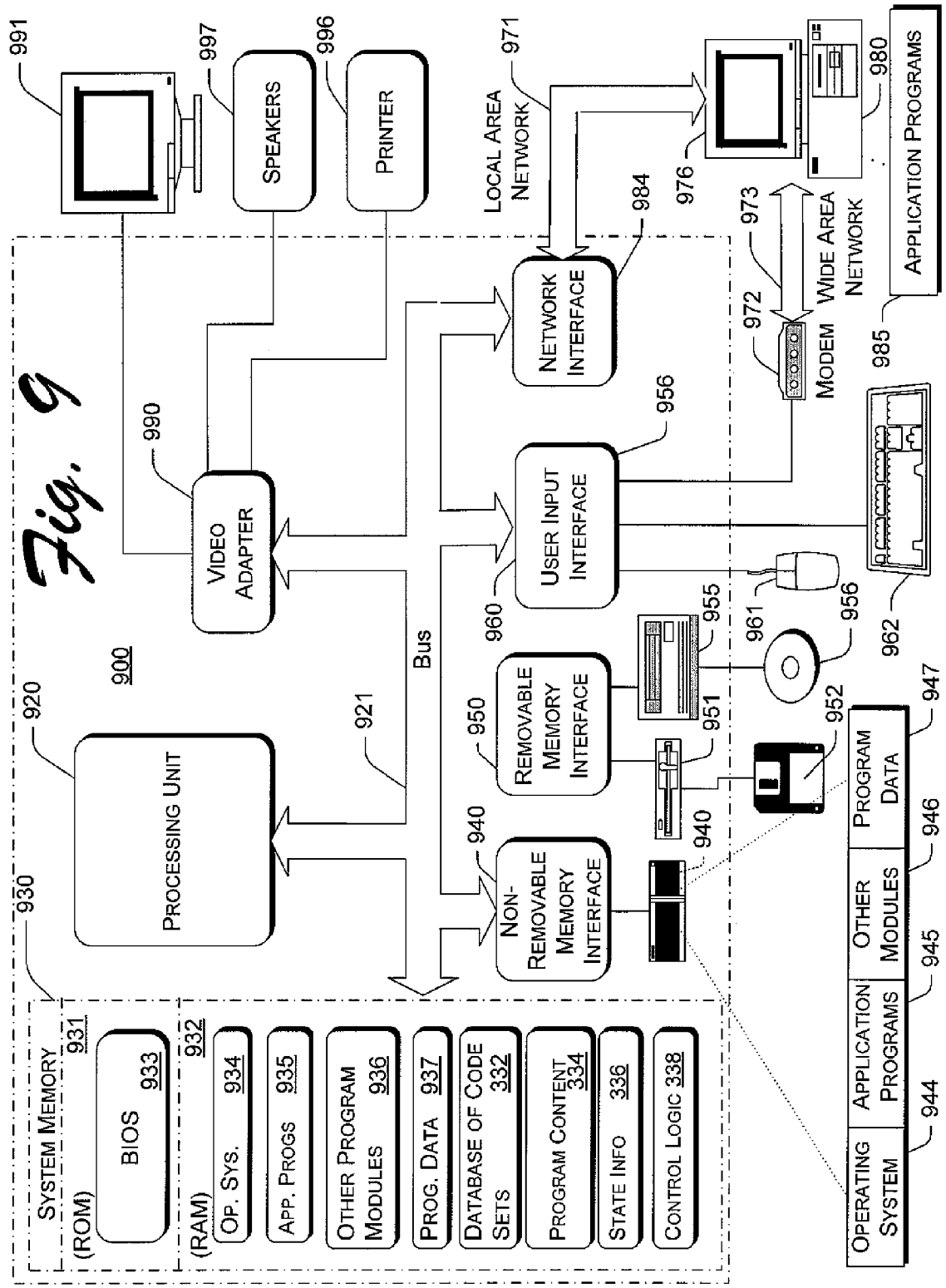

CONTEXT-SENSITIVE REMOTE CONTROLS

RELATED APPLICATIONS

This application is a continuation of and claims priority to U.S. patent application Ser. No. 10/641,424 entitled, "Context-Sensitive Remote Controls," to Daniel J. Zimond et al., filed Aug. 15, 2003, now U.S. Pat. No. 7,064,675.

TECHNICAL FIELD

This invention relates generally to multimedia systems and specifically to context-sensitive remote controls.

BACKGROUND

Many households have multiple television and multimedia devices including TVs, video cassette recorders (VCRs), digital versatile disc (DVD) players, stereos, and the like ("controllable devices"). Alice is a homeowner who likes stereo music in her living room and in her bedroom while reading. She also likes various television programs while relaxing and when she does chores in specific rooms such as the kitchen and utility room.

The various TV sets and video players around Alice's house are beginning to get a little out of hand. The remote controllers ("remotes") for these various controllable devices only work well with the one device or brand of device that they were created to control. Although Alice has five video and stereo components in her main living room entertainment center, these five components still require four remote control units. Alice finds herself inadvertently carrying remote controllers from some of the rooms into the kitchen when she wants a snack and getting the remotes mixed up with other remotes that are native to the kitchen. All nine of the remote controllers she has stationed around her house look the same because they have similar shapes and colors.

Sometimes a remote controller that Alice has unconsciously carried to a different room does not work at all with any of the components in that room, but sometimes the transported remote works for some functions but not for others. Alice sometimes grabs the wrong remote controller during an exciting part of a show and finds that the volume controls do not work or the "Begin Recording" key does not function—she has picked up the wrong remote!

SUMMARY

Subject matter includes a reprogrammer for roving remote controllers that are capable of being used in multiple locations with different devices to be controlled at each location. An exemplary roving remote controller changes control code sets to operate whatever devices are present in a particular room. In one implementation, an exemplary multimedia system has reprogrammers for one or more roving remote controllers that adapt to their setting. When a remote controller is moved from a first room to a second room, the program content being controlled in the first room is automatically transferred to the second room.

BRIEF DESCRIPTION OF THE DRAWINGS

FIG. 5 is a flow diagram of an exemplary method of using a context-sensitive remote.

FIG. 9 is a block diagram of an exemplary computer suitable for performing parts of the subject matter.

DETAILED DESCRIPTION

Overview

Figure 1:
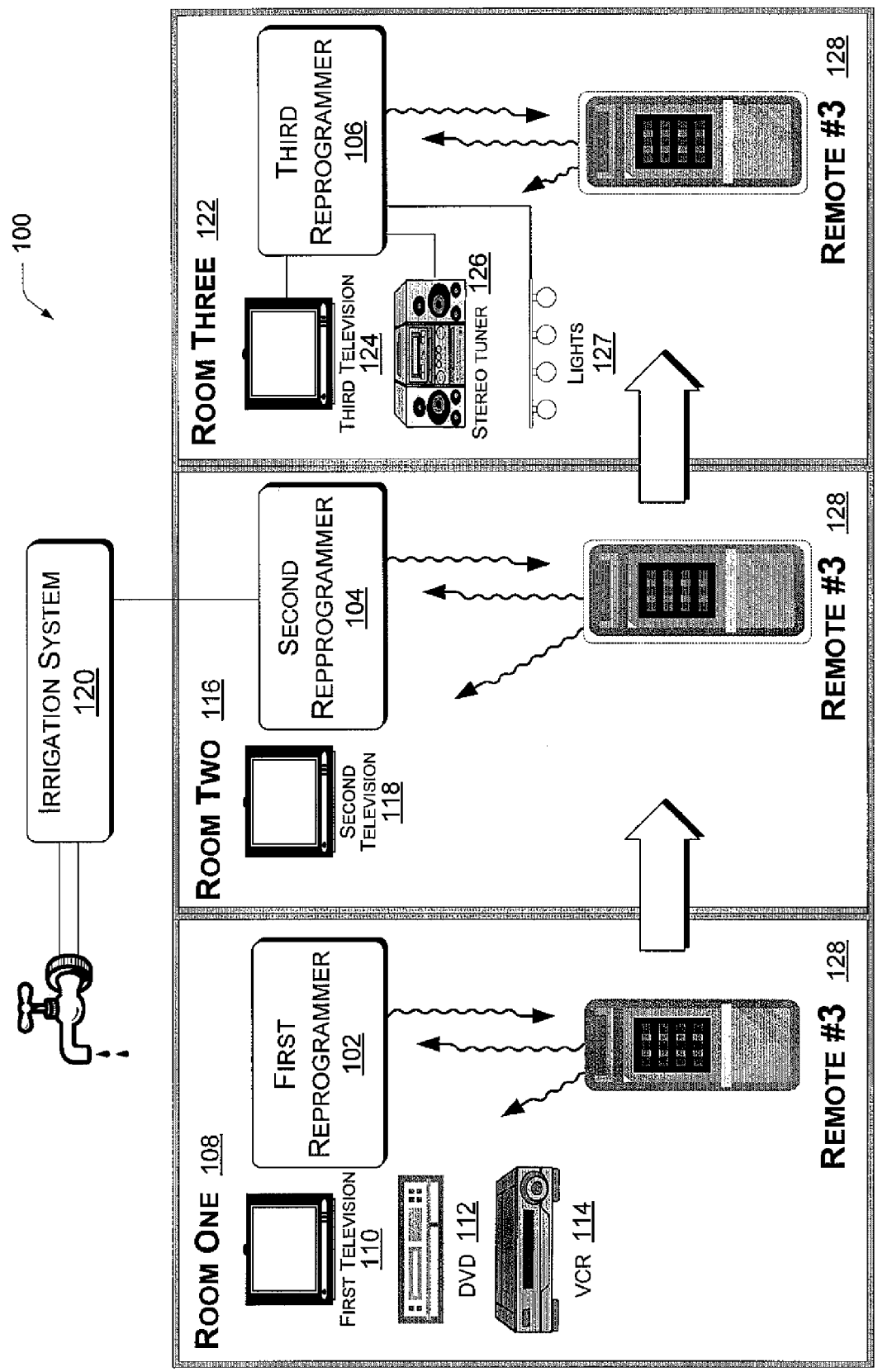
FIG. 1 is a graphic representation of a home system using reprogrammers for remote controllers.

Subject matter includes a reprogrammer for remote controllers ("remotes") that are capable of being used in multiple locations with different devices to be controlled at each location. In one implementation, an exemplary multimedia system uses the reprogrammers for one or more roving remotes that can adapt to their setting so that when one of the remotes is moved from a first room to a second room, the program content being controlled in the first room is automatically transferred to the second room.

In one implementation of the subject matter, an exemplary reprogrammer notifies each remote used in its presence of the proper code sets to be used for communicating with each controllable device in the location of the reprogrammer. An exemplary reprogrammer monitors for incoming signals from a remote and sends out information for the remote to tune itself to that location. The information sent from a reprogrammer to a remote for purposes of tuning to a location may consist of a code set identifier (or "code set ID"). The code set identifier informs the remote to use a code set relevant to a controllable device in the instant location. In some instances the reprogrammer may send the code set itself to the remote if the remote does not possess it.

In the context of a multimedia system ("media network"), exemplary reprogrammers may be used with (or as) nodes of the media network to not only reprogram roving remotes as they are carried from room to room but also to inform the media network's central hub of the location of each remote so that the central hub can send programming content to whichever room a given remote currently occupies as it moves around the house.

In either implementation described above, when a remote is moved between rooms, e.g., from one reprogrammer or node to the next, the subsequent node or reprogrammer instructs the remote to use proper code sets for operating controllable devices in the current location. In a media network context, where nodes are networked, the media network can retain not only programming information but also settings, etc., that a user of the remote was enjoying in a previous room or location. The user may have paused a multimedia presentation, such as a broadcast television program at a certain sound volume in the previous room and when the presence of the roving remote is sensed in the new room the media network can automatically resume the program at a comparable initial sound volume in the new room and at the point in the program that the program was previously paused.

A "code set" as the phrase is used herein can consist of a simple instruction implemented by a remote, or can be a set of instructions. Each code set is usually identified by a label or tag ("identifier"), for example, a four digit numeric identifier such as "0007." A code set in a media network context is typically a collection of instruction sequences that cause a controllable device to perform various functions (channel change, fast forward, volume control, etc.). Likewise, besides TVs, VCRs, and DVDs mentioned above, a "controllable device" can also be a cable box, a set top box, a compact disc (CD) player, an audio tuner, an audio cassette player/recorder, a satellite tuner, a laser disc player, a computer, an appliance, a special effects device (e.g., an onstage fog machine), lights, an irrigation system, a sprinkler system, an airflow system, a burglar alarm system, an audio/visual surveillance system, etc. Thus, a code set for each of these controllable devices is a collection of instruction sequences relevant to each type of controllable device.

In the description that follows, standalone reprogrammers (i.e., reprogrammers that are not networked with each other or with a common hub) will be described first, followed by description of reprogrammers that are used in the context of an exemplary media network that uses the reprogrammers within the network structure.

Exemplary Systems

FIG. 1 shows a home 100 that includes three rooms in which three implementations of standalone reprogrammers 102, 104, 106 store and keep track of ("manage") code sets for controllable devices in their respective rooms. Each of the three reprogrammers 102, 104, 106 store requisite code sets for communicating with roving remotes, such as exemplary remote #3 128. Remote "#3" 128 is capable of transmitting to each of the three reprogrammers 102, 104, 106 and is capable of receiving communication from these reprogrammers. This two-way communication allows a remote 128 to receive instructions to use code sets relevant for the controllable devices in each of the multiple locations.

In the first implementation, a first reprogrammer 102 in a first room 108 has pre-stored code sets for controlling a first TV 110, a DVD player 112, and a VCR 114. The first reprogrammer 102 is not in communication with any of the controllable devices for which it manages code sets. Thus, the first reprogrammer 102 represents an implementation that stores code sets and/or code set identifiers that have been input (or selected) by a user to control the controllable devices in a location, e.g., room one 108, but has no other communicative relationship with the controllable devices. When the first reprogrammer 102 receives input from a remote newly arrived in its location, the reprogrammer 102 sends to the remote 128 the code set identifiers (or the code sets themselves) which the remote then uses to communicate directly with the controllable device(s) in that location.

In the second implementation, the second reprogrammer 104 in the second room 116 has pre-stored control code sets for controlling a second TV 118, and an auxiliary device, in this case, an outdoor home irrigation system 120. The second reprogrammer 104 is in communication with one of the controllable devices for which it manages a code set, namely the irrigation system 120, but is not in communication with the other controllable device for which it manages a code set, the second television 118. The second reprogrammer 104 represents an implementation that may receive input (or selection) of code sets and code set identifiers via a user and/or via a communicative link with a coupled controllable device, e.g., the irrigation system 120 or a control module thereof. For some controllable devices in its location, the second reprogrammer 104 may send a code set identifier or the code set itself so that the remote 128 can control the controllable device directly. But with respect to other communicatively coupled controllable devices, because of the communicative coupling, the second reprogrammer 104 may also engage in some degree of communication and/or control with the coupled controllable device. That is, after sending code set identifiers and/or code sets to a remote in its location, the second reprogrammer 104 may mediate control of a controllable device by receiving communications from the remote (e.g., a code from a code set) and may perform control of the controllable device. Hence, the remote 128 may send an instruction to start the irrigation system 120 to the second reprogrammer 104 and the second reprogrammer 104 starts the irrigation system 120.

In the implementation, the third reprogrammer 106 in the third room 122 has pre-stored code sets for controlling a third TV 124, a stereo tuner 126, and lights 127. The third reprogrammer is in communication with all three controllable devices for which it manages code sets. The third reprogrammer 106 represents an implementation that may be programmed with code sets and/or code set identifiers via a user and/or via a coupled controllable device. The third reprogrammer 106 may control some or all of the controllable devices or the remote 128 may control some or all of the controllable devices directly. The third reprogrammer 106 performs the same functions in the same manner as the second reprogrammer 104 described above and in addition can be programmed to control a particular controllable device based on the functioning of another controllable device—or based on an instruction from a remote intended for another controllable device. For example, the third reprogrammer 106 may automatically dim the lights 127 when the remote 128 sets the stereo tuner 126 to a certain broadcast station, even though the remote 128 contains a code set for controlling the lights 127 directly.

In each of the three implementations described above, the reprogrammers 102, 104, 106 function in a standalone manner. Reprogrammers used in the context of an exemplary media network will now be described.

Figure 2:
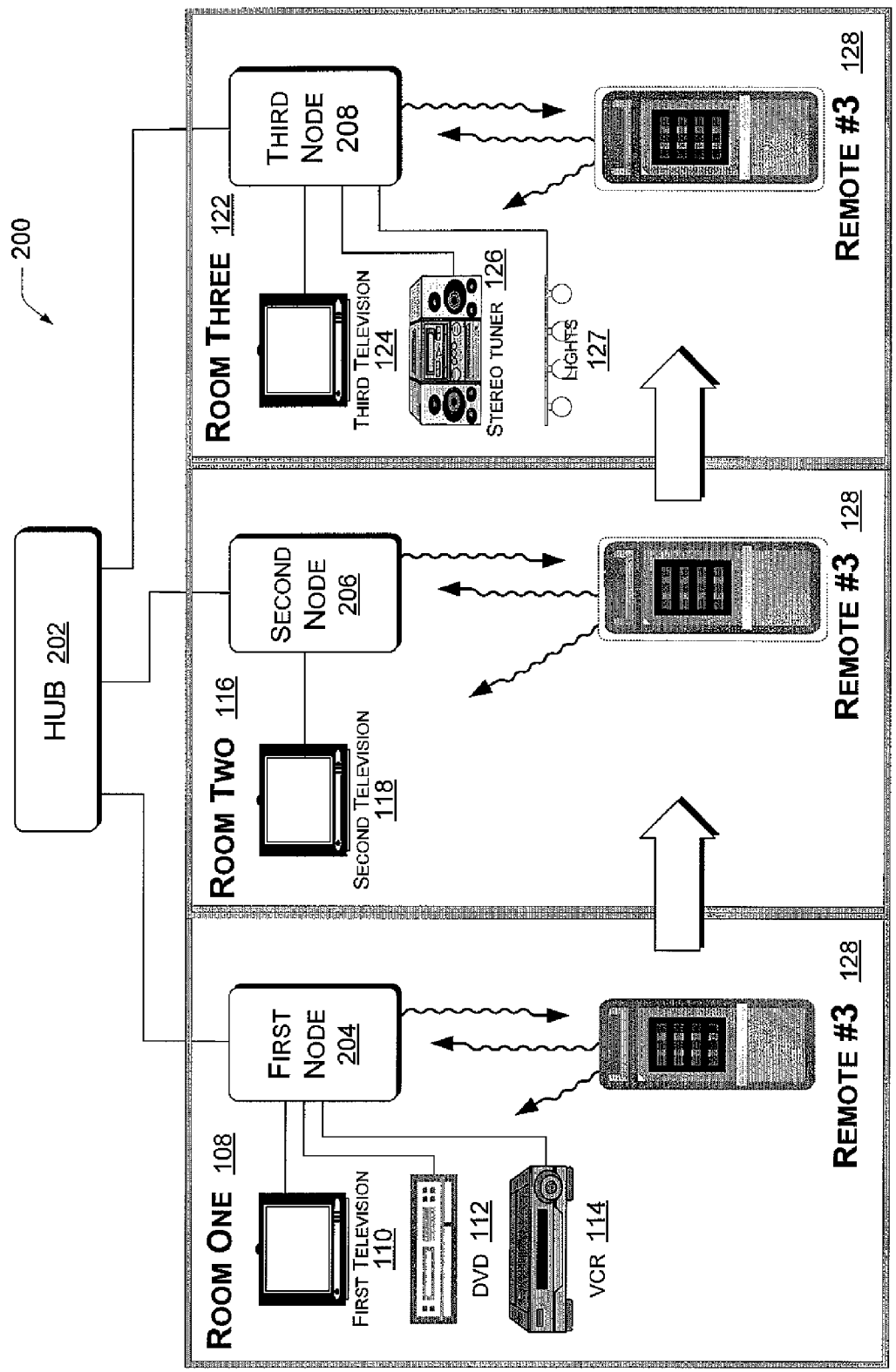
FIG. 2 is a graphic representation of an exemplary media network that uses portable context-sensitive remotes.

FIG. 2 shows an implementation of an exemplary media network 200 having a central hub 202. In this implementation, each of the reprogrammers is a node (e.g., 204) or part of a node of the media network 200 and therefore communicatively coupled with the central hub 202. In one implementation, when an exemplary remote, such as remote #3 128, transmits a command or a request, it sends within the transmission or in addition to the transmission an identity signal, such as an identifier that is unique to the remote 128 in the media network 100. When a node, such as the first node 204, receives a transmission from a "new" remote 128, that is, a remote 128 with a different unique identifier than the last remote to communicate with the node, then the node 204 transmits a message to the remote 128 to use code sets appropriate for the controllable devices in the current location, in this case the first TV 110, the DVD player 112, and the VCR 114 residing in room one 108. The transmitted message is typically an alphanumeric identifier for each code set stored in the remote 128 that is to be used in that location. The remote 128 then starts using the new code set(s) and can operate the controllable devices in the room 108. If the remote 128 is transported to a different room, similar communications occur between another node and the remote 128.

It should be noted that a remote, such as exemplary remote "#3" 128, typically communicates directly with controllable devices coupled to a node of the media network 200. However, in this implementation, the remote 128 also communicates with the media network itself (200) via one of the nodes in order to request program content or settings for use on a controllable device and to enable a user to navigate electronic program guide information.

When an exemplary remote 128 transmits its identity to a node (e.g., 206) and the node 206 responds by sending the remote 128 a message or identifier to use different code sets for the new room context, the new code sets may be implemented in several ways. In one implementation, each exemplary remote 128 contains a variety of code sets in an onboard database. A code set can be made active for a given context. In another implementation, code sets for controllable devices in a given room are stored in a node for that room and transmitted to a remote when the remote is used in that room. In yet another implementation, the code sets are stored in a hub 202 of the media network 100 and transmitted via the nodes to remotes as needed for the controllable devices in a room. In still another implementation, a hub or a node transmits all code sets for an entire media network 100 in a single one-time "download" transmission into the remote so that the remote has all the code sets for the entire media network 200 and can use them interchangeably as instructed for a changing context.

In some implementations of an exemplary media network 200, a hub 202 can store or provide program content, settings, and code sets for the entire media network 200 and all coupled controllable devices and also keep track of the state of each node and remote in the media network 200. Thus, when a remote 128 traverses from one room to the next, the hub 202 can send program content and settings being used by the remote 128 to whichever room the remote 128 currently occupies.

In one implementation, a remote "#3" 128 periodically sends out transmissions of its unique identifier, e.g., a number, such as "#3." A node in one of the rooms receives the identity transmission and makes a shift of programming to the program content that the remote 128 was controlling in its previous room. Hence, when a user, who has an exemplary media network 200 installed in his home, walks with his remote from the dining room to the kitchen, living room, and other rooms throughout the house, the programming in each room changes to the program, movie, or musical piece he is enjoying. In one implementation, when the user carries the remote 128 around the house, the programming content in a given room along the user's travel path changes only if a button on the remote is actuated. In another implementation, when the user carries the remote 128 around the house, the programming content in a new room that the user enters changes only if a previously actuated "pause" button is "unpaused."

In some implementations of a media network 200, a hub 202 may keep track of timed and/or periodic household events. Hence, a roving remote 128 may be able to control auxiliary devices, such as outdoor sprinkler systems, heating-ventilation-air conditioning systems, burglar alarm systems, etc. as the roving remote 128 changes active code sets based on the roving remote's current location and/or context.

Figure 3:
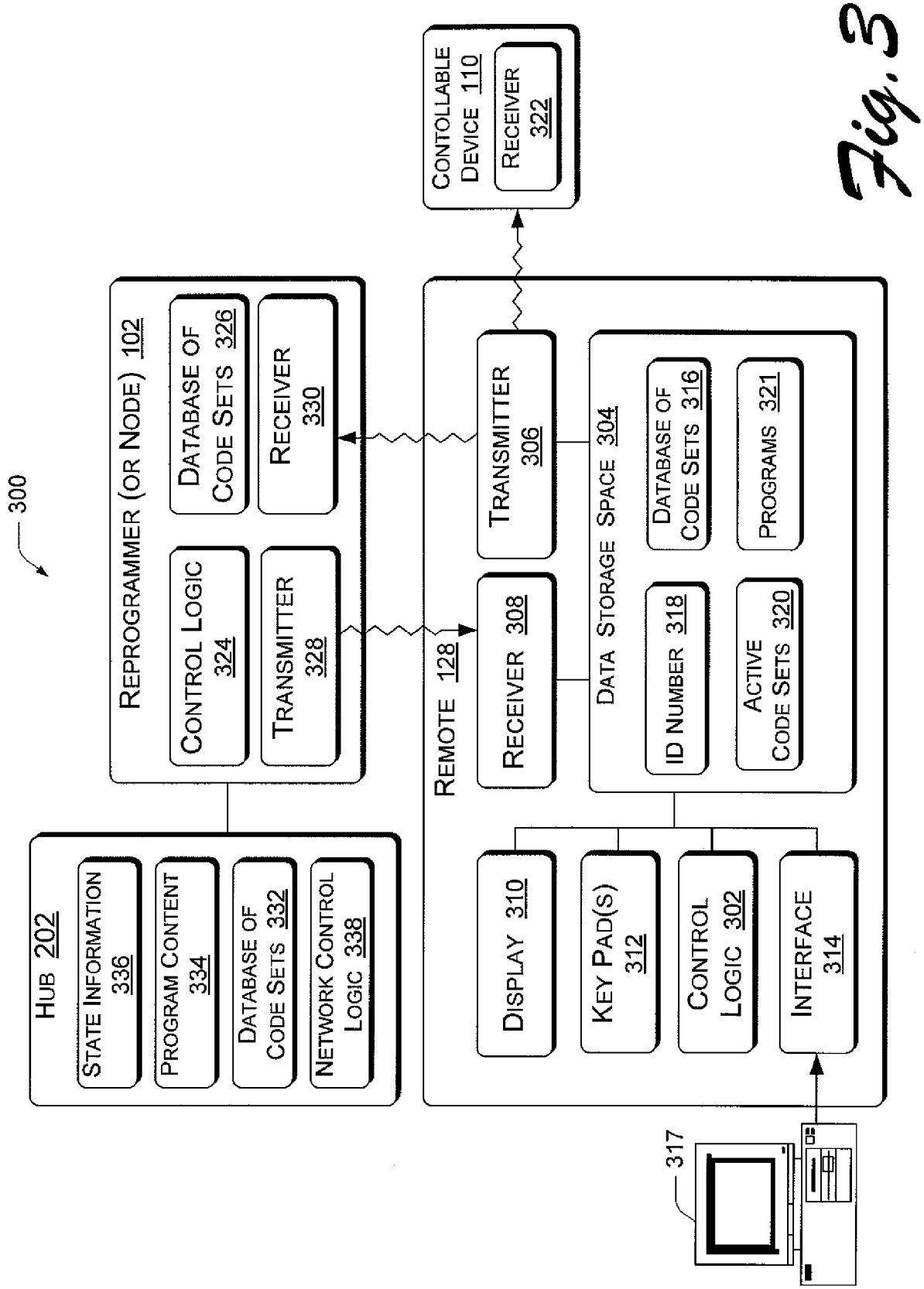
FIG. 3 is a block diagram of components in an exemplary media network.

FIG. 3 shows exemplary components 300 of an exemplary media network 200 in greater detail. Exemplary components for a remote 128 include control logic 302 communicatively coupled with data storage space 304, such as volatile memory and/or a non-volatile storage medium, a transmitter 306, a receiver 308, an optional display 310, one or more keypads 312, and an interface 314 for inputting control logic from an external computer 317 and for inputting other information, for example, code sets for a database of code sets 316. The interface 314 may be a universal serial bus (USB) port, an RS-232 serial interface, an infrared transceiver, etc.

The data storage space 304 may contain an ID number 318 or other identifier that is unique to a remote 128, as well as active code sets 320 for a given current context, and other programs 321, e.g., for requesting program content from a hub 202 or for navigating electronic program guide information. The data storage space 304 can be implemented as a combination of read/write memory, such as static random access memory (SRAM), and read-only memory, such as electrically programmable read only memory (EPROM).

The transmitter 306 transmits communication and control signals via infrared, radio frequency, or some other wireless means from the remote 128 to a node 204 and to a receiver 322 associated with one of a plurality of controllable devices, e.g., TV 110.

The display 310 may optionally be present on the remote 128 to visually display information to the user. In one implementation, the display 310 is a liquid crystal type.

The keypad(s) 312 enable a user to input data and command selections to the remote 128 and may comprise various combinations of buttons and switches, etc.

An exemplary remote 128 can include more, fewer, or different components as will be appreciated by those skilled in remote control arts.

Exemplary components for a node 204 (and/or reprogrammer) include node control logic 324, a node database of code sets 326, a transmitter 328, and a receiver 330. A node 204 may also include memory, a processor, and/or other computing components and may retain information onboard or receive information from a hub 202.

An exemplary node 204 (and/or reprogrammer) can include more, fewer, or different components as will be appreciated by those skilled in computing and communications arts.

An exemplary hub 202 may contain a database of code sets 332 and may send these and segments of program content 334, instructions, and/or settings to nodes and controllable devices in the exemplary media network 200. An exemplary hub 202 may also include network control logic 338 and state information 336 that represents current locations and code sets in use by particular nodes, remotes, and other components in the exemplary media network 200. A hub 202 may share many of the characteristics of an exemplary computer 900, such as that illustrated in FIG. 9, and/or may be at least in part an exemplary computer 900 suitable for implementing the media network 200.

In one implementation, a hub 202 serves as the central "brain" for an exemplary media network 200, while alternatively there may be multiple hubs. The nodes may serve as local onsite "brains" or control nexi for each room serviced by an exemplary media network 200. Thus, one or more hub(s) 202, node(s) 102, remote(s) 128, and controllable device(s) 110 coordinate with each other to allow one or more exemplary remote(s) 128 to adapt to current contexts, thereby affording the user seamless control via one or more remotes that each function universally when moved around the home or other site.

Exemplary Methods

Figure 4:
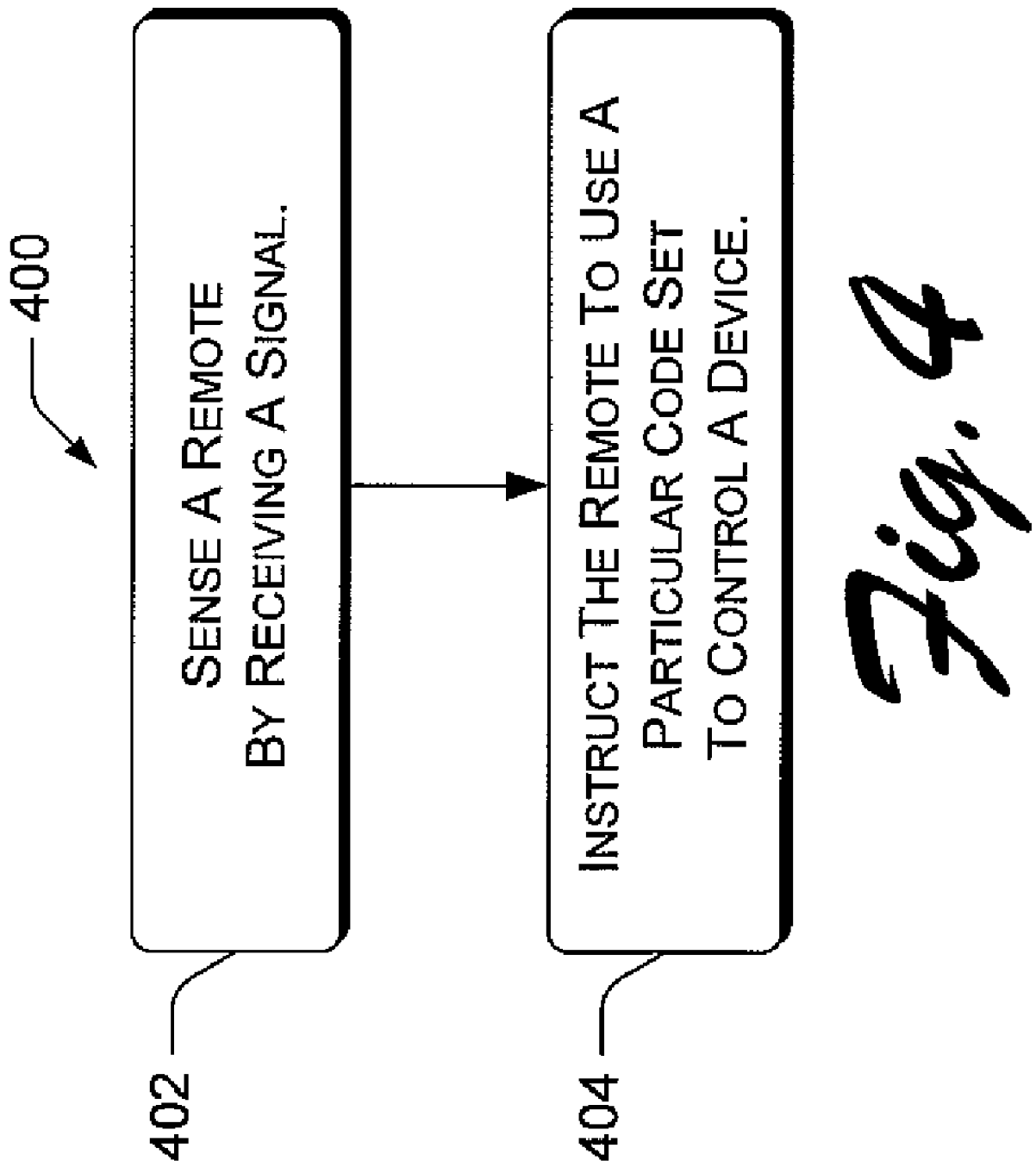
FIG. 4 is a flow diagram of an exemplary method of enabling a context-sensitive remote.

FIG. 4 shows an exemplary method 400 of imparting context sensitivity to a remote. In the flow diagram, the operations are summarized in individual blocks.

At block 402, a remote 128 is sensed within the communication "range" of a node in a multimedia network. The reprogrammer (e.g., 102) or node (e.g., 204) itself senses the remote 128. The sensing can include receiving an identity signal from the remote controller, such as a unique identifier of the remote controller within the context of the given multimedia network as discussed above. An infrared sensor, a visible light sensor, a radio frequency sensor, a magnetic sensor, and/or an electrical sensor, etc., can be included in performing the sensing.

At block 404, the reprogrammer or node instructs the remote to use a particular code set to control a device coupled with the media network. For example, the reprogrammer or node can instruct the remote to use a code set stored on the remote or can send the remote the code set, e.g., from the node itself or from a hub of the media network 200, as described above with respect to FIG. 2. For transmitting an instruction to a remote 128, an infrared, visible light, radio frequency, magnetic, and/or electrical transmission means can be used.

FIG. 5 shows another exemplary method 500 of imparting context sensitivity to a remote. In the flow diagram, the operations are summarized in individual blocks.

At block 502, an entity of a media network, such as a remote, a node, or a hub, remembers a multimedia event, e.g., a program, controlled in a first room or location by an exemplary remote 128. Of course, multimedia events include a condition or a setting of a device coupled with the media network 200.

At block 504, when the remote moves from the first room or location to a second room or location, the multimedia event is automatically resumed in the second room or location, e.g., at the point it was paused in the first room or location.

Exemplary Communication Through Code Sets

Figure 6:
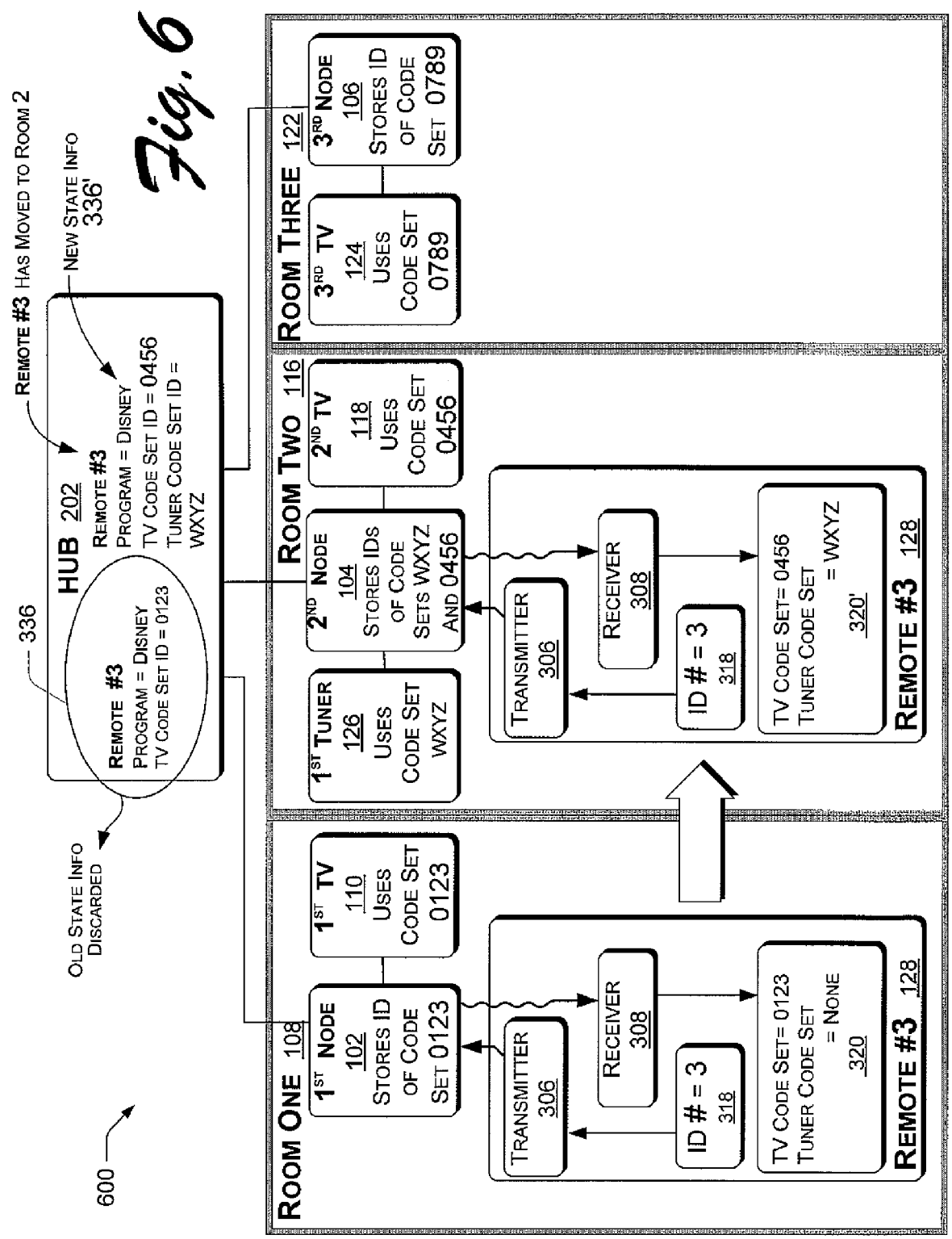
FIG. 6 is a graphic representation of exemplary code set adaptation in an exemplary media network.

FIG. 6 shows exemplary code sets assigned to various components and devices in an exemplary media network 600. In one implementation, each node 204, 206, 208 stores code sets and/or code set identifiers to communicate with each exemplary remote used in the media network 600. Hence, if six exemplary remotes are used, each node may store six exemplary remote code sets or code set identifiers (unless all six exemplary remotes use the same code set). Typically a large number of code sets are built into a remote and therefore each node may only need to store identifiers for each code set. When a node, such as the second node 206, receives a remote's identity signal, such as an ID number 318 with a value of "3" for remote "#3" 128, the node 206 uses an appropriate code set to communicate with the recognized remote 128.

Each controllable device 110, 118, 124, 126 in the exemplary media network 600 has a code set through which it can be controlled. Each node 204, 104, 106 stores the code sets or code set identifiers to operate each controllable device communicatively coupled with itself, i.e., in its control domain. A node's control domain may be different than its communication range with one or more remotes. In other words, a node may control a device that is far outside a home, for example, a lighting system on an out-building a half-mile away, but may have a communication range for remotes of only twenty feet as limited by the walls of a room or the efficiency of a transceiver for communicating with the remotes.

The illustrated second node 206 stores the code sets or code set identifiers of a coupled second TV 118 and a coupled first tuner 126. The code set for the second TV 118 is "0456" and the code set for the first tuner 126 is "WXYZ." Remote "#3" 128, however, is not presently in the same "room two" 116 as the second node 206. Thus, remote "#3" 128 actively uses control codes appropriate for where it currently resides, namely, a code set "0123" for the first TV 110 in "room one" 108.

When remote "#3" 128 is moved from room one 108 to room two 116 it transmits its identity to the second node 206 residing in room two 116. The transmission may occur when a button on remote "#3" 128 is actuated, or in one implementation, remote "#3" 128 sends out a periodic identity transmission signals. If remote "#3" 128 is not "tuned" to the controllable devices 118, 126 in room two 116, then the second node 206 sends a message to remote "#3" 128 instructing remote "#3" 128 to switch to the appropriate control codes and/or code sets 320'. As mentioned above, in one implementation the second node 206 sends remote "#3" 128 the identifier "0456" of appropriate code set(s) to use while in another implementation the second node 206 sends remote #3 128 the actual code set itself. In another or the same implementation, the second node 206 does not retain or may not possess a code set for a particular controllable device (e.g., one of 118, 126) residing in its control domain but instead requests the proper code set from a hub 202 and relays the received code set to roving remote "#3" 128.

In one implementation, state information 336 and 336' is retained in a hub 202 of the media network 600. When remote "#3" 128 was residing in room one 108, the state information 336 for remote "#3" 128 may have included, among other things, the remote's unique identifier 318 within the media network 600, pointers to the program content that remote "#3" 128 was controlling, and a record of various current code sets being used by remote "#3" 128 in room one 108. When remote "#3" 128 is move to room two 116, at least part of the state information 336 may be discarded in favor of new state information 336' for remote "#3" 128. Hence, an identifier of a new code set "0456" for the second TV 118 in room two 116 may be stored in the new state information 336' as well as an identifier of an additional code set "WXYZ" for a first tuner 126 that is also coupled with the second node 206 in room two 116. An indication of the multimedia program that remote "#3" 128 was controlling may remain the same in the new state information 336', i.e., the state information 336' may contain an indicator of progress with respect to playback of a multimedia program. Thus, if remote "#3" 128, now in room two 116, unpauses a program that it previously paused in room one 108, the hub 202 can consult the state information 336' to resume play of the program in room two 116 instead of room one 108. The multimedia program associated with remote "#3" 128 can be automatically resumed by remote "#3" 128 in any room or location served by the media network 600 just by carrying remote "#3" 128 to a new room or location.

In one implementation, the "current" programming being controlled by an exemplary remote 128 may expire as state information 336' for the remote 128 after a predetermined interval of the remote's non-use, for example twenty minutes.

Figure 7:
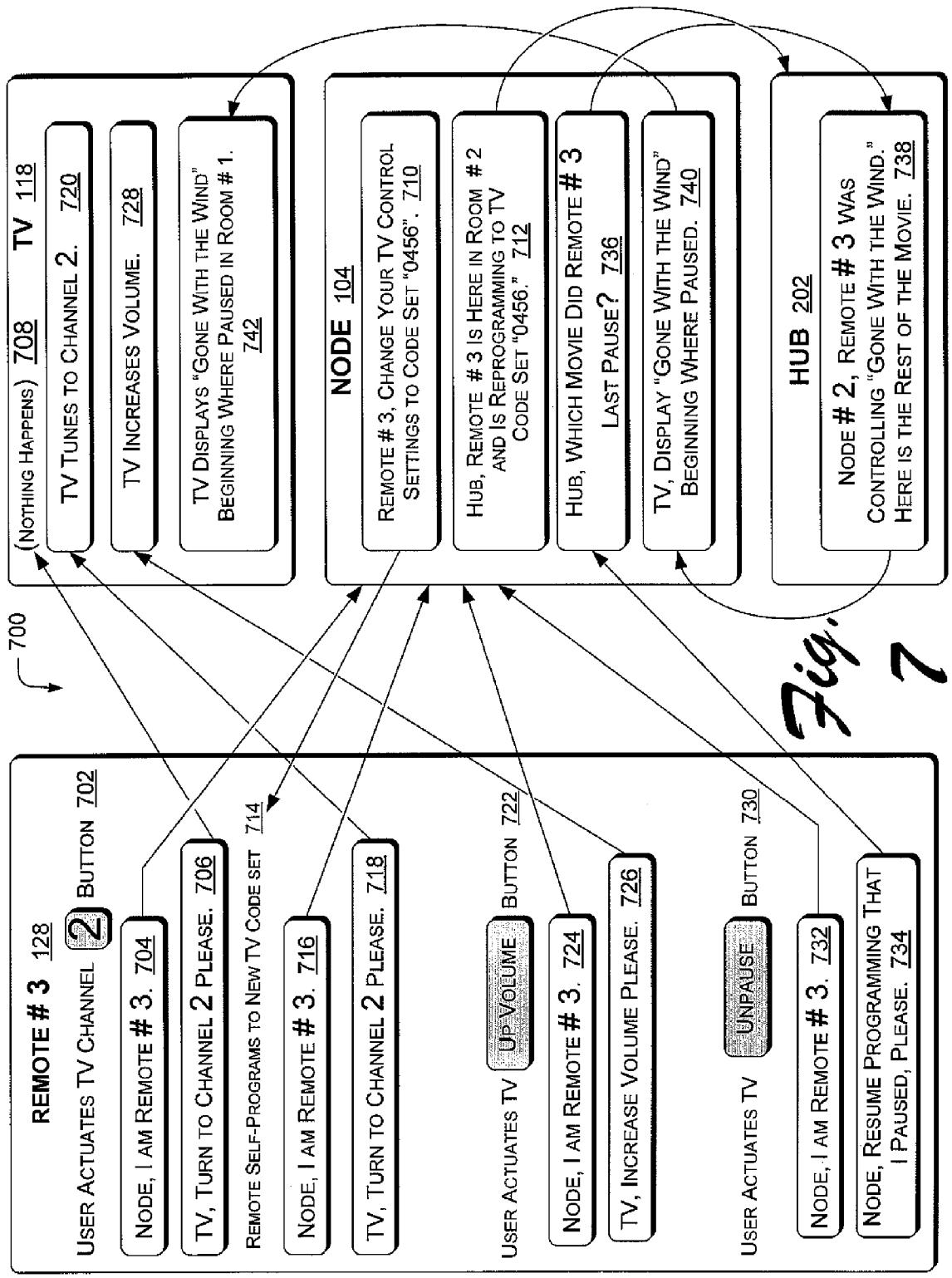
FIG. 7 is a graphic representation of exemplary communication between components of an exemplary media network.

FIG. 7 shows exemplary "two-way" communications 700 between components of an exemplary media network, such as those illustrated in FIGS. 2 and 6. In the illustrated example, remote "#3" 128 has just been transported by a user from room one 108 to room two 116. Communication events and effects are illustrated in blocks and lines of text.

At line 702, a user actuates a keypad "channel 2" button of remote "#3" 128 located in room two 116 in order to tune the second TV 118 to channel two. At block 704, remote "#3" 128 transmits an identifying signal representing the statement "Node, I am remote #3." Within the same transmission signal or in addition to it, at block 706 remote "#3" 128 transmits a command signal to the second TV 118 to tune to channel two, representing, "TV, turn to channel two, please." At line 708, nothing happens, because the control codes of code set "0456" for operating the second TV 118 are not actively being used by remote "#3" 128.

The node 206 receives the "I am remote #3" transmission and in response at block 710 transmits a signal representing, "Remote #3, change your TV control code set to code set 0456." At block 712, the second node 206 also notifies the hub 202 that remote "#3" 128 is now in room two 116 and that the TV control code set "0456" will now be active for remote "#3" 128. At line 714, remote "#3" 128 receives the transmission from the node and begins using TV code set "0456" or alternatively, remote "#3" 128 receives a transmission of code set "0456" in an on-the-spot download and begins using the code set. At block 716, remote "#3" 128 re-transmits "Node, I am remote #3" and also re-transmits "TV, turn to channel 2 please." At block 720, since remote "#3" 128 is now using the correct control code set "0456" for the second TV 118, the second TV 118 tunes to channel 2.

A little later, the user actuates a TV "Up Volume" button on remote "#3" 128. Remote "#3" 128 again transmits "Node, I am remote #3" just in case remote "#3" 128 has been moved to a different room and also transmits a signal representing "TV, increase your volume please." At block 728, since correct control codes are now in use by remote "#3" 128, the second TV 118 increases its audio volume.

A little later, the user actuates an "Unpause" button on remote "#3" 128, as remote "#3" 128 includes a keypad section for such control. The user has previously paused a presentation of "Gone With The Wind" in room one 108 before carrying remote "#3" 128 to room two 116. At block 732, remote "#3" 128 transmits "Node, I am remote #3" and at block 734 also transmits a signal representing "Node, please resume programming that I previously paused." The second node 206 responds to the latter transmission at block 734 by transmitting a signal representing a request, "Hub, which movie did remote #3 last pause?" At block 738, the hub 202 responds with a signal representing, "Node #2, remote #3 was controlling 'Gone With The Wind,' here is the remainder of that movie." At block 740, the second node 206 receives the programming content and controls the second TV 118, represented by "TV, please display 'Gone With The Wind' beginning at this point (where paused)." At block 742, the second TV 118 displays "Gone With The Wind" beginning where the movie left off when it was previously paused in room one 108.

Further Exemplary Implementation

Figure 8:
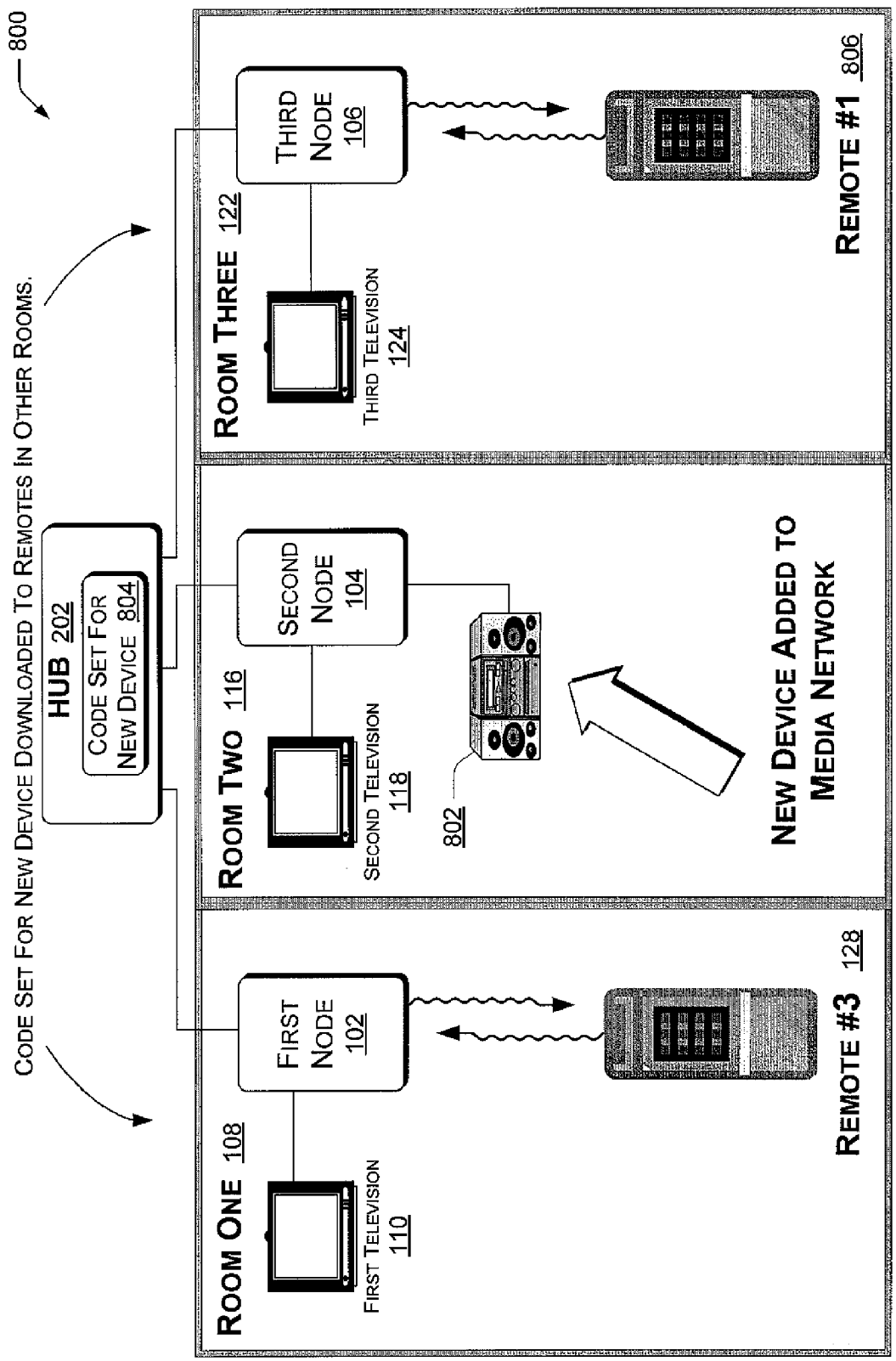
FIG. 8 is graphic representation of an alternative technique for adapting code sets in exemplary remotes.

FIG. 8 shows an alternative implementation of an exemplary media network 800, wherein a new controllable device 802 is added to the exemplary media network 800 by being coupled with a node of the media network, such as the second node 206 in room two 116.

In one implementation, each exemplary remote has a dynamic database of code sets 316 (FIG. 3). Hence, a new code set can be assimilated by an exemplary remote from any node that is part of the exemplary media network 800. Once a new code set 804 for a newly installed device 802 is retained at a hub 202, the new code set 804 can be sent to each remote regardless of its current room or location. Hence, when remote "#3" 128 is next used and sensed in room one 108. The first node 204 in room one 108 transmits the new code set 804 for the new device 802 in room two 116 to the database of code sets 316 in remote "#3" 128. Likewise, when remote "#1" 806 is next used and/or sensed, in this instance in room three 122, the third node 208 in room three 122 transmits the new code set 804 for the new device 802 in room two 116 to the database of code sets 316 in remote "#1" 806. Hence, there are several ways that an exemplary media network (e.g., one of 100, 200, 600, 800) can impart context sensitivity to a portable or roving remote.

Exemplary Computing Device

FIG. 9 shows an exemplary computer 900 suitable as an environment for practicing aspects of the subject matter. The components of exemplary computer 900 may include, but are not limited to, a processing unit 920, a system memory 930, and a system bus 921 that couples various system components including the system memory 930 to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computer 900 typically includes a variety of computer-readable media. Computer-readable media can be any available media that can be accessed by exemplary computer 900 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by exemplary computer 900. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within exemplary computer 900, such as during start-up, is typically stored in ROM 931. RAM 932 typically contains data and/or program modules that are immediately accessible to and/or presently being operated on by processing unit 920. By way of example, and not limitation, FIG. 9 illustrates in RAM 932 an operating system 934, application programs 935, other program modules 936, and program data 937, a database of code sets 332, program content 334, media network state information 336, media network control logic 338, etc. Although some components of an exemplary media network hub 202 are depicted as software in random access memory 932, other implementations of an exemplary a hub or other components of a media network 200 can be hardware or combinations of software and hardware.

The exemplary computer 900 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface such as interface 950.

The drives and their associated computer storage media discussed above and illustrated in FIG. 9 provide storage of computer-readable instructions, data structures, program modules, and other data for exemplary computer 900. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the exemplary computer 900 through input devices such as a keyboard 962 and pointing device 961, commonly referred to as a mouse, trackball, or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port, or a universal serial bus (USB). A monitor 991 or other type of display device is also connected to the system bus 921 via an interface, such as a video interface 990. In addition to the monitor 991, computers may also include other peripheral output devices such as speakers 997 and printer 996, which may be connected through an output peripheral interface 995.

The exemplary computer 900 may operate in a networked environment using logical connections to one or more remote computers, such as a remote computer 980. The remote computer 980 may be a personal computer, a server, a router, a network PC, a peer device or other common network node, and typically includes many or all of the elements described above relative to exemplary computer 900, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets, and the Internet.

When used in a LAN networking environment, the exemplary computer 900 is connected to the LAN 971 through a network interface or adapter 970. When used in a WAN networking environment, the exemplary computer 900 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the exemplary computer 900, or portions thereof may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

CONCLUSION

The foregoing describes an exemplary multimedia network system in which roving remotes can act universally by adapting to context. Some of the subject matter described above can be implemented in hardware, in software, or in both hardware and software. In certain implementations, the exemplary system and related methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The invention claimed is:

1. A multimedia system, comprising:
   a hub having access to multimedia content;
   one or more nodes communicatively coupled with the hub and with respective controllable devices for using the multimedia content;
   one or more portable remote controllers for communicating with the nodes, wherein in response to communicating with a particular node, a portable remote controller operates the controllable devices communicatively coupled with the particular node; and
   wherein in response to the portable remote controller moving from a first node to a second node, the hub discontinues providing the multimedia content to the first node and resumes providing the multimedia content to one of the controllable devices communicatively coupled with the second node.

2. The multimedia system as recited in claim 1, wherein each node has a transmitter and a receiver for two-way communication with a remote controller and each remote controller has a transmitter and a receiver for two-way communication with a node.

3. The multimedia system as recited in claim 1, wherein the portable remote controller has active code sets each for communicating with one of the controllable devices and changes active code sets by receiving an identifier of a new code set from the particular node.

4. The multimedia system as recited in claim 1, wherein the portable remote controller changes active code sets by receiving a new code set from the particular node.

5. The multimedia system as recited in claim 1, wherein the portable remote controller has a data storage space for storing code sets and changes active code sets by using a code set from the data storage space.

6. The multimedia system as recited in claim 1, further comprising a unique identifier for each portable remote controller to enable the hub to associate an ongoing multimedia event with a portable remote controller that is being moved from a first node to a second node.

7. A method, comprising:
   sensing a remote controller in a first location;
   instructing the remote controller to use a first code set to control a first device;

sending a multimedia event to the first device;

sensing the remote controller in a second location;

instructing the remote controller to use a second code set to control a second device; and sending the multimedia event to the second device.

8. The method as recited in claim 7, wherein the sensing further comprises receiving an identity signal from the remote controller.

9. The method as recited in claim 8, wherein the identity signal comprises a unique identifier that identifies the remote controller regardless of location.

10. The method as recited in claim 7, further comprising sending the second code set to the remote controller.

11. Nodes for controlling interactions between a hub, one or more controllable devices, and one or more portable remote controllers in a multimedia network system, each node comprising:

a receiver for sensing a presence of one or more of the portable remote controllers;

a communicator for sending an indication of a current presence of each of one or more of the portable remote controllers to the hub;

wherein in response to a movement of one of the portable remote controllers, the hub sends multimedia content to a sequence of the nodes, wherein the sequence follows the movement of the portable remote controller.

12. The nodes as recited in claim 11, wherein each node includes a transmitter to send an instruction, wherein the instruction informs one of the remote controllers which control code sets to use for devices in the current location of the remote controller.

13. The nodes as recited in claim 12, wherein one of the nodes sends one or more of the control code sets to the remote controller.

* * * * *